United States Patent
Cheng et al.

(10) Patent No.: US 11,537,189 B2
(45) Date of Patent: Dec. 27, 2022

(54) POWER SUPPLY CONTROLLERS

(71) Applicant: Hewlett-Packard Development Company, L.P., Spring, TX (US)

(72) Inventors: Chao-Wen Cheng, Taipei (TW); Roger A. Pearson, Fort Collins, CO (US); Jonathan D. Bassett, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/980,505

(22) PCT Filed: Jun. 11, 2018

(86) PCT No.: PCT/US2018/036878
§ 371 (c)(1),
(2) Date: Sep. 14, 2020

(87) PCT Pub. No.: WO2019/240753
PCT Pub. Date: Dec. 19, 2019

(65) Prior Publication Data
US 2021/0089101 A1  Mar. 25, 2021

(51) Int. Cl.
*G06F 1/28* (2006.01)
*G06F 1/3234* (2019.01)
*G06F 1/3296* (2019.01)

(52) U.S. Cl.
CPC .............. *G06F 1/28* (2013.01); *G06F 1/3243* (2013.01); *G06F 1/3296* (2013.01)

(58) Field of Classification Search
CPC ......... G06F 1/28; G06F 1/3243; G06F 1/3296
See application file for complete search history.

(56) References Cited

U.S. PATENT DOCUMENTS

| | | | |
|---|---|---|---|
| 9,261,934 B2 | 2/2016 | Uan-Zo-Li | |
| 9,577,509 B2 | 2/2017 | Wang et al. | |
| 9,698,591 B2 | 7/2017 | Jiang | |
| 2008/0198525 A1 | 8/2008 | Janssen | |
| 2014/0281618 A1 | 9/2014 | Sultenfuss et al. | |
| 2016/0252942 A1* | 9/2016 | Varma | G06F 1/3212 713/322 |
| 2016/0320827 A1 | 11/2016 | Ou Yang et al. | |
| 2017/0068293 A1* | 3/2017 | Nathadi | G06F 1/08 |
| 2017/0199556 A1 | 7/2017 | Sultenfuss et al. | |
| 2019/0094942 A1* | 3/2019 | Matsumura | G06F 1/3212 |
| 2019/0265776 A1* | 8/2019 | Montero | G06F 1/324 |

FOREIGN PATENT DOCUMENTS

| | | |
|---|---|---|
| CN | 103499736 | 8/2016 |
| WO | WO-2009006014 | 1/2009 |

* cited by examiner

*Primary Examiner* — Zahid Choudhury
(74) *Attorney, Agent, or Firm* — HP Inc. Patent Department

(57) ABSTRACT

Example implementations relate to power supply controllers. In some examples, a controller can include instructions to: set a power threshold for a power supply coupled to a computing component when the computing component is operating in a first state, determine when the computing component is alternating from the first state to a second state, and allow the power supply to exceed the power threshold for a fixed period of time in response to the computing component alternating from the first state to the second state.

12 Claims, 5 Drawing Sheets

POWER SUPPLY CONTROLLERS

BACKGROUND

A power supply can be a device that can supply electrical power to an electric load. For example, a power supply can be utilized to provide electrical power to a component of a computing device. In some examples, the power supply can be utilized to convert input power to output power that can be utilized by the electric load. For example, the power supply can convert an input voltage that may not be able to be utilized by computing components to an output voltage that may be utilized by the computing components.

DETAILED DESCRIPTION

Computing devices can include a plurality of electrical components such as processing resources, memory resources, and cooling resources. A power supply can be utilized to provide electrical power to the plurality of electrical components. As used herein, a power supply can include a device to provide electrical power to an electrical component. In some examples, the power supply can be utilized to provide a particular power level to the electrical components. For example, the power supply can be utilized to provide a particular voltage and/or current to the electrical components.

In some examples, the computing device can be regulated by legal restrictions. For example, the power supply of the computing device can be regulated by a power threshold. In some examples, the power threshold can include an electrical power threshold and a time threshold. For example, a power threshold can be a legal restriction with an electrical power threshold of 240 volt-amps and a time threshold of one minute. In this example, the power supply may not legally exceed 240 volt-amps for a timer duration longer than one minute. In some examples, the legal restrictions can apply to portions of the computing device. For example, the legal restrictions can apply to user-accessible energy hazards, but may not be applied to non-accessible energy hazards. As used herein, a user-accessible energy hazard can include components that are accessible by a user when the components are activated and non-accessible energy hazards can include components that are not accessible by a user when the components are activated.

In some examples, computing devices can be provided with components that may utilize a load or total load that is greater than the electrical power threshold. The present disclosure provides devices, systems, and machine readable mediums for providing such components with electrical power. In some examples, the power supply can be coupled to a controller that can monitor and alter settings of the power supply. In some examples, the controller can allow the power supply to exceed the electrical power threshold for a fixed period of time. As described further herein, the controller can utilize a timer to ensure that the power supply does not exceed the electrical power threshold for longer than the time threshold. Thus, the controller can allow the power supply to provide electrical power to the computing components that is greater than the electrical power threshold, but still comply with legal restrictions.

Figure 1:
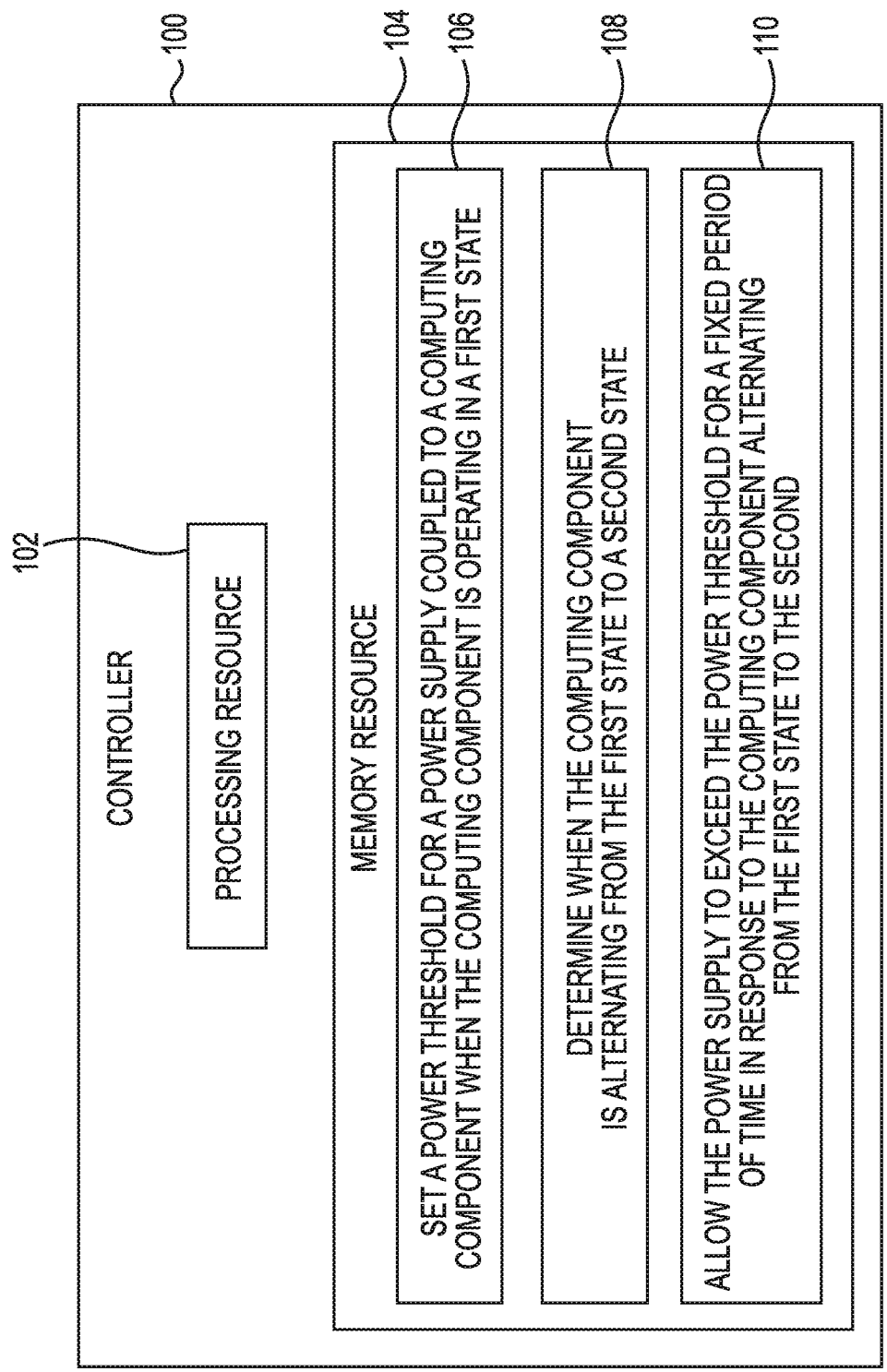
FIG. 1 illustrates an example controller for a power supply consistent with the present disclosure.

FIG. 1 illustrates an example controller 100 for a power supply consistent with the present disclosure. The controller 100 can be utilized to monitor and control the settings and functions of a power supply. As used herein, a power supply or power supply unit can include a device that provides electrical power to a load such as computing components. For example, a power supply can convert electrical power from a first voltage or current to a second voltage or current that can be utilized by a particular load. In some examples, the power supply can be coupled to a load with a power rail. As used herein, a power rail includes a device or system for transferring electrical power from the power supply to computing components of a computing device.

As illustrated in FIG. 1, the controller 100 may comprise a processing resource 102 and a memory resource 104 storing machine-readable instructions to cause the processing resource 102 to perform an operation relating to a power supply. As used herein, a memory resource 104 can be a non-transitory machine-readable storage medium. Although the following descriptions refer to an individual memory resource 104, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

In some examples, the memory resource 104 can be coupled to a processing resource 102. A processing resource 102 may be a central processing unit (CPU), microprocessor, and/or other hardware device suitable for retrieval and execution of instructions stored in the memory resource 104. In some examples, a processing resource 102 may receive, determine, and send instructions. As an alternative or in addition to retrieving and executing instructions, a processing resource 102 may include an electronic circuit comprising an electronic component for performing the operations of the instructions in the memory resource 104. With respect to the executable instruction representations or boxes described and shown herein, it should be understood that part or all of the executable instructions and/or electronic circuits included within one box may be included in a different box shown in the figures or in a different box not shown.

Memory resource 104 may be any electronic, magnetic, optical, or other physical storage device that stores executable instructions. Thus, memory resource 104 may be, for example, Random Access Memory (RAM), an Electrically-Erasable Programmable Read-Only Memory (EEPROM), a storage drive, an optical disc, and the like. The executable instructions may be "installed" on the memory resource 104. Memory resource 104 may be a portable, external or remote storage medium, for example, that allows a system that includes the memory resource 104 to download the instructions from the portable/external/remote storage medium. In this situation, the executable instructions may be part of an "installation package". As described herein, memory resource 104 may be encoded with executable instructions related to a power supply. Even though a memory resource 104 is illustrated in FIG. 1, examples of the controller 100 are not so limited. For example, the controller 100 can be a hardware device that can perform the functions described as instructions.

In some examples, the controller 100 can be a power supply controller that is coupled to a particular power supply and control functions of the particular power supply. For example, the controller 100 can be utilized to monitor a functionality of a power supply and/or perform functions relating to the power supply. In some examples, the controller 100 can be a controller for a plurality of power supplies.

The controller 100 may include instructions 106 stored in the memory resource 104 and executable by a processing resource 102 to set a power threshold for a power supply coupled to a computing component when the computing component is operating in a first state. As used herein, a power threshold includes a power restriction that can be implemented by the power supply to prevent electrical power provided to a component from exceeding a particular level of voltage, current, volt amps, and/or watts. In some examples, the power threshold can include an electrical power threshold that defines a particular quantity of power to be delivered across a power rail and the power threshold can include a time threshold that defines a particular quantity of time that the power supply can exceed the electrical power threshold.

In some examples, the controller 100 can be utilized to prevent the power supply from providing electrical power at a level that is greater than the power threshold. For example, the controller 100 can include instructions to alter settings or functions of the power supply to prevent the power supply from providing electrical power above 240 volt-amps.

In some examples, the power threshold can be a legal restriction for a system that includes the power supply. For example, the system can be a server chassis that can include the power supply and computing components coupled to the power supply with a power rail. In this example, a legal restriction can regulate the system such that the power supply may not be legally capable of providing electrical power above 240 volt-amps for longer than 60 seconds. In some examples, the legal restriction can be implemented for safety of users utilizing the system. For example, the legal restriction can provide safety restrictions to avoid injuring a user utilizing the system. In some examples, the power threshold can be at a level that is lower than the legal restriction. In these examples, the lower power threshold can provide potentially lower risks to users than the legal restrictions.

In some examples, the component can be a computing component such as a processing resource, memory resource, cooling resource, and/or other types of electrical components that can be utilized for a computing system. In some examples, the component can be a computing component or plurality of components that are powered by the same power rail. In some examples, the component or plurality of components can be operating in a first state that can correspond to a first power level. For example, the first state can be a lower power state, a normal operation state, and/or a non-boost state of the component.

In some examples, the first state can be defined when the component is operating at a particular performance level or percentage of performance capacity of the component. For example, the first state can be a state when the component is operating at a performance level that is less than 75 percent of the performance capacity of the component. That is, the component can be operating at 75 percent of the total performance capacity of the component. In some examples, the first state can correspond to a first load level. In other examples, the first state can be a range of performance. For example, the component can be between 15 percent and 60 percent of total performance capacity.

As used herein, a load level corresponds to a quantity of load drawn by the component or components. In some examples, a component can have different operation states that can correspond to different load levels. For example, a component operating at a first level can have a first load level and the component operating at a second level can have a second load level. In some examples, a load level of a component can cause the power provided by the supply to exceed the power threshold.

The controller 100 may include instructions 108 stored in the memory resource 104 and executable by a processing resource 102 to determine when the computing component is alternating from the first state to a second state. In some examples, the second state can be a boost state from the first state of the component. That is, the first state can be a normal state of the component that can be utilized during relatively long durations and the second state can be a boost state of the component that can be utilized during relatively short durations. However, in other examples, the first state and the second state can be utilized during similar time durations. In some examples the first state can include a performance that is between 0 percent and 75 percent capacity for the component and the second state can include a performance that is between 75 percent and 100 percent capacity for the component. In this way, the second state can be a relatively higher performance than the first state. In addition, the first state can have a first load level and the second state can have a second load level that is greater than the first load level.

In some examples, the power supply may have to exceed the power threshold in order to provide the electrical power to the component when the component transitions from the first state to the second state. That is, the component can operate within the first state on the electrical power provided by the power supply when the power supply is under the power threshold. In this example, the component may need the power supply to exceed the power threshold to operate in the second state. Thus, the power supply may exceed the power threshold to provide electrical power to the component when the component is operating in the second power state.

The controller 100 may include instructions 110 stored in the memory resource 104 and executable by a processing resource 102 to allow the power supply to exceed the power threshold for a fixed period of time in response to the computing component alternating from the first state to the second state. In some examples, the controller 100 can allow the power supply to exceed the power threshold and provide the computing component with enough electrical power to operate in the second state for a fixed period of time.

As described herein, the power threshold can include an electrical power threshold (e.g., power restriction, power level that may not be exceeded for a particular period of time, etc.) and also include a time threshold (e.g., duration of time that may not be exceeded above the electrical power threshold). In this example, the power level may be exceeded, but the duration of time may not be exceeded. For example, the electrical power threshold may be 240 volt-amps and the time threshold can be one minute. In this example, the controller 100 may allow the power supply to exceed the power level of 240 volt-amps for a duration that is less than one minute to allow the computing component to operate in the second state.

In some examples, the controller 100 can include instructions to deactivate the power supply when a timer reaches the fixed period of time. As described further herein, the controller 100 can deactivate or turn off the power supply when the timer reaches the fixed time period to prevent the power supply or system from exceeding the power threshold time limit. In some examples, the controller 100 can deactivate the power supply to prevent delivery of electrical power from the power supply beyond the power threshold time limit. For example, the power supply can be connected to a load that does not alter from the second state back to the first state. In this example, the power supply can be deactivated to ensure a power-time threshold.

In some examples, the controller 100 can include instructions to alter a load of the computing component below the power threshold when a timer reaches the fixed period of time. As described herein, the controller 100 can alter a state or load level of the computing components such that the controller 100 can change the components from the second state to a first state to bring the total load of the components to a level that is below the threshold power level.

In some examples, the controller 100 can include instructions to restart the fixed period of time when the power delivered by the power supply falls below the power threshold. As used herein, restarting the fixed period of time can include zeroing a timer to a starting point. For example, it can be determined that the power supply is below the electrical power threshold for a particular period of time such that the timer can be restarted. In some examples, the controller 100 can include instructions to determine a quantity of time that the power supply is below the power threshold. In some examples, the quantity of time can be utilized to determine when a timer is to be stopped or restarted.

In some examples, the controller 100 can be utilized to alter the performance of the load or demand of the load to operate within the power threshold specifications, which can include an upper level power threshold and a time threshold. In these examples, the power level may be exceeded without exceeding the duration of time. Thus, the power supply is not exceeding a legal limit and still providing electrical power to allow the computing component to operate within the second state for a fixed period of time.

Figure 2:
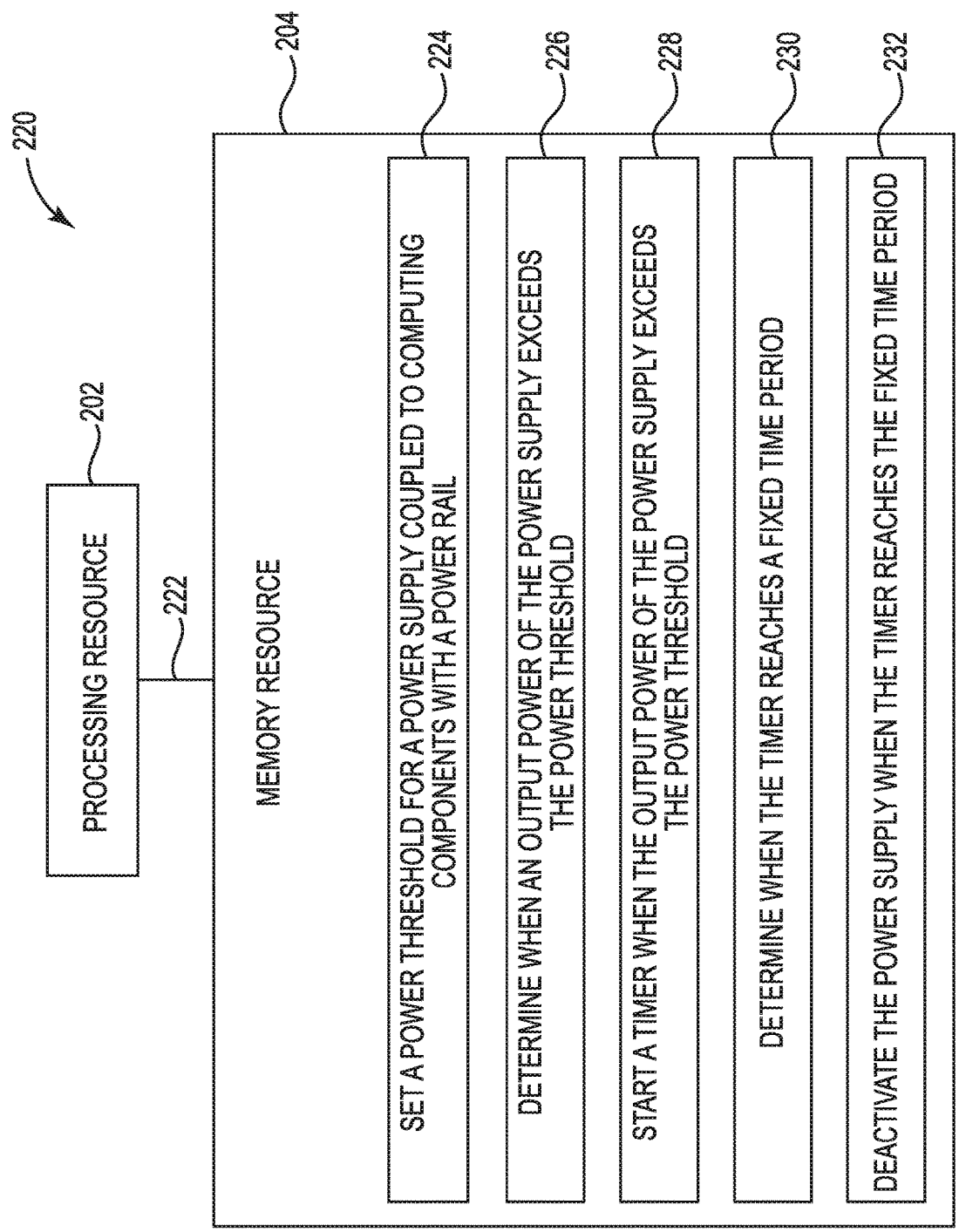
FIG. 2 illustrates an example memory resource for a power supply consistent with the present disclosure.

FIG. 2 illustrates an example memory resource 204 for a power supply consistent with the present disclosure. As used herein, a memory resource 204 can be a non-transitory machine-readable storage medium. In some examples, the memory resource 204 can be coupled to a processing resource 202 via a connection 222. The connection 222 can be an electrical or communicative connection to allow communication between the processing resource 202 and the memory resource 204. A processing resource 202 may be a central processing unit (CPU), microprocessor, and/or other hardware device suitable for retrieval and execution of instructions stored in the memory resource 204.

The memory resource 204 can include instructions 224 that can be executable by a processing resource 202 to set a power threshold for a power supply coupled to computing components with a power rail. In some examples, the power threshold for the power supply can be an electrical power threshold for electrical power provided to the computing components with the power rail. For example, the power threshold can include an upper limit or electrical threshold of power, voltage, and/or amperage that is provided by the power supply through the power rail to the computing components. In some examples, the power threshold can include a time threshold for electrical power provided over a period of time. For example, the power threshold can include an electrical threshold of 240 volt-amps and a period of time of one minute. That is, in this example, the power threshold can prevent the power supply from providing more than 240 volt-amps for a period of time longer than one minute.

The memory resource 204 can include instructions 226 that can be executable by a processing resource 202 to determine when an output power of the power supply exceeds the power threshold. In some examples, the memory resource 204 can include instructions to monitor a power level provided over a power rail and/or provided over a plurality of power rails. For example, the memory resource 204 can receive power levels monitored by an electrical sensor coupled to the power supply, power rail, and/or computing components. In some examples, the power level of the computing components can be monitored by the load being utilized by the computing components. For example, the state of the computing components can be determined based on a load level of the computing components.

In some examples, the monitored power level can be utilized to determine when the power supply is exceeding the power threshold. For example, a sensor can determine when the load of the computing components exceeds the power threshold. As described herein, the power threshold can include an electrical threshold of power to be provided to the computing components for a specified maximum quantity of time. In some examples, the instructions 226 can be utilized to determine when the electrical power provided by the power supply exceeds the power threshold to be provided to the computing components.

The memory resource 204 can include instructions 228 that can be executable by a processing resource 202 to start a timer when the output power of the power supply exceeds the power threshold. In some examples, the timer can be started when the power supply exceeds the power threshold of electrical power to be provided to the computing components. In some examples, the timer can be utilized to determine a quantity of time that the power supply is providing power over the power threshold. For example, the timer can be started when the power supply exceeds the electrical threshold defined by the power threshold and stopped when the power supply provides electrical power below the electrical threshold defined by the power threshold.

In some examples, the timer can include a time limit at a fixed time period. As used herein, the time limit can include a quantity of time to allow the power supply to exceed the electrical threshold defined by the power threshold. As described herein, the power threshold can include an electrical threshold of electrical power to be provided by the power supply and a time threshold that defines a quantity of time that the power supply is able to exceed the electrical threshold of the power threshold. Thus, the timer can include a time limit that can be based on the period of time defined by the power threshold. In some examples, the threshold time limit of the timer can be a quantity of time that is less than the period of time defined by the power threshold. For example, the power threshold can be a legally defined restriction that includes the period of time and the time limit of the timer can be a lower quantity of time than the period of time to prevent the power supply from exceeding the period of time defined by the power threshold. In some examples, the period of time can be a maximum time period allowed for exceeding the electrical threshold of the power threshold. In this way, the timer can be utilized to identify when the power supply is about to exceed the legally defined restriction.

The memory resource 204 can include instructions 230 that can be executable by a processing resource 202 to determine when the timer reaches a fixed time period. As described herein, the fixed time period can be based on the power threshold for the power supply. For example, the fixed time period can be based on a quantity of time the power supply is legally allowed to exceed an electrical threshold of power provided to the computing components. In some examples, the fixed time period can be a quantity of time that is less than the quantity of time the power supply is legally allowed to exceed the electrical threshold such that power demanded by the load can be lowered below the electrical threshold and/or the power supply can be deactivated to prevent the power supply from exceeding the legally defined restriction.

The memory resource 204 can include instructions 232 that can be executable by a processing resource 202 to deactivate the power supply when the timer reaches the fixed time period. As used herein, instructions to deactivate the power supply can include turning off the power supply or preventing the power supply from continuing to provide electrical power to the power rail and/or the computing components. For example, the memory resource 204 can monitor and alter a load of the computing components and thus alter the electrical power provided by the power supply. In this example, the instructions 232 can deactivate the power supply when the timer reaches the fixed time period to prevent the power supply from exceeding the time threshold of the power threshold when the computing components continue to provide a demand that utilizes a greater level of electrical power than the electrical threshold of voltage and/or current defined by the power threshold.

In some examples, the memory resource 204 can include instructions to alter a load of the computing components to bring the power supply below the power threshold prior to the timer reaching the fixed time period and to restart the timer when the power supply exceeds the power threshold. As described herein, a load of the computing components can be altered to either exceed the power threshold for the power supply or bring the load below the power threshold for the power supply. In some examples, the timer can be utilized to determine a time to bring the load of the computing components below the electrical threshold of the power threshold before the time limit occurs. For example, the power threshold can include a time threshold of 60 seconds and the timer can be utilized to determine the time when the load of the components are altered. In this example, the time threshold can be 60 seconds and the timer can be utilized to provide a notification at 57 seconds such that 3 seconds can be utilized to alter the load of the components before the time threshold is reached.

In some examples, the timer can be utilized to prevent the power supply from breaking a legal restriction defined by the power threshold. For example, the power threshold can include an electrical threshold and a time period threshold. In this example, the electrical threshold can be exceeded for a period of time that is less than the time period. Thus, the timer can be utilized to prevent the power supply from exceeding the time period, and if the timer reaches the fixed time period, the power supply can be deactivated to prevent the power supply from breaking the legal restriction.

Figure 3:
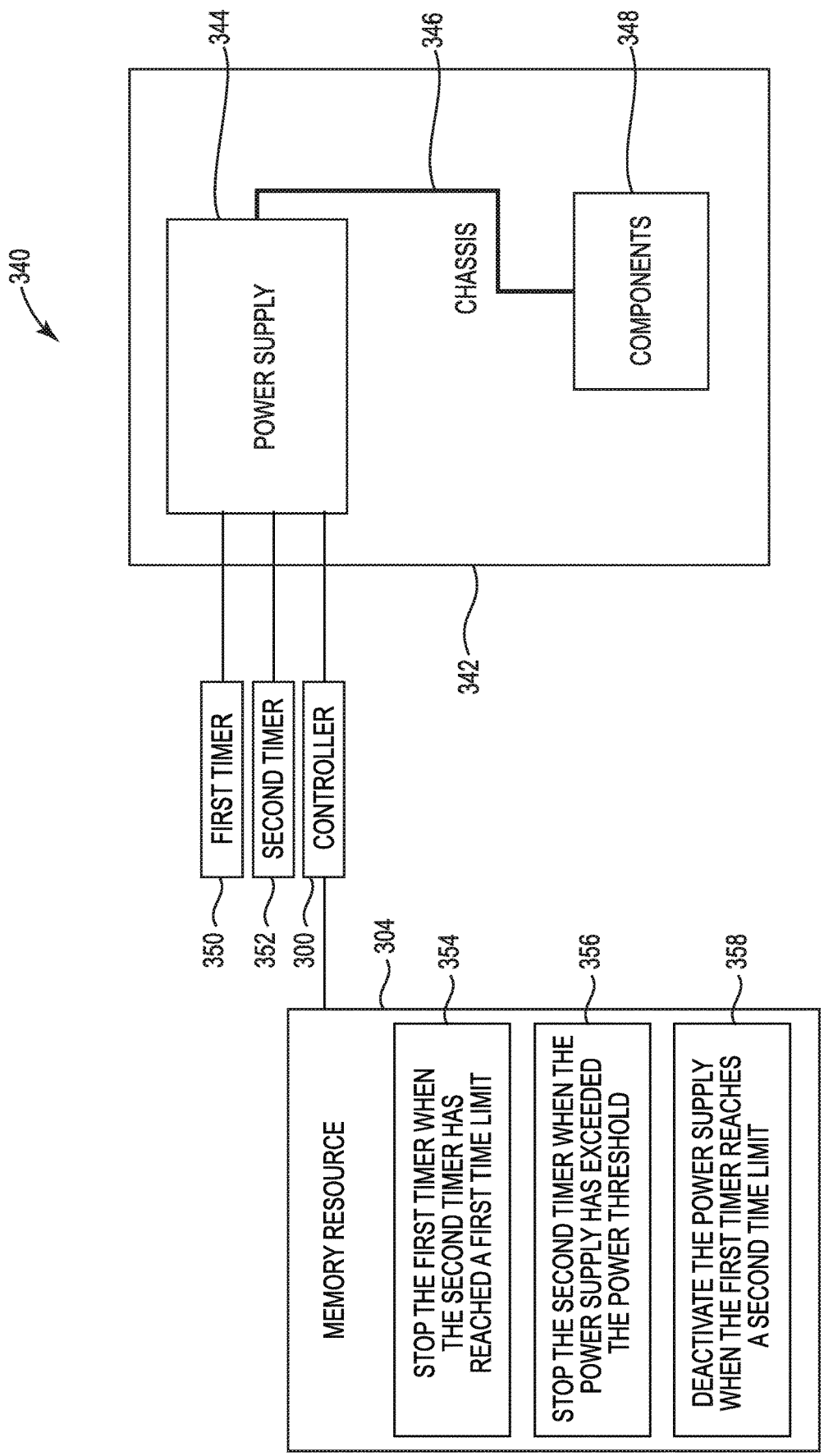
FIG. 3 illustrates an example system for a power supply consistent with the present disclosure.

FIG. 3 illustrates an example system 340 for a power supply consistent with the present disclosure. In some examples, the system 340 can include a server chassis 342 that includes a power supply 344 coupled to components 348 via a power rail 346. In some examples, the power supply 344 can be coupled to a controller 300. As described herein, the controller 300 can include a processing resource and a memory resource 304 to execute instructions stored on the memory resource 304. In some examples, the power supply 344 and/or the controller 300 can be coupled to a first timer 350 and a second timer 352. As used herein, a timer (e.g., first timer 350, second timer 352, etc.) can be hardware timers or software timers that can quantify a quantity of time that has passed from a start time. Even though the memory resource 304 is illustrated in FIG. 3, examples of the controller system 340 are not so limited. For example, the controller 300 can be a hardware device that can perform the functions described as instructions stored within the memory resource 304.

In some examples, the system 340 can include a power supply 344 coupled to a plurality of computing components 348 by a single power rail 346. As described herein, a power rail 346 can be an electrical connection that can transfer the electrical power from the power supply 344 to the plurality of computing components 348. In some examples, the power threshold described herein can be assigned to the power rail 346. That is, in some examples, the power threshold can be set for a single power rail 346 of the chassis 342. In some examples, the power threshold can be a legal restriction for electrical power provided to the electrical components 348. For example, the power threshold can include an electrical threshold of power to be provided to the electrical components 348 via the power rail 346 and include a time period for exceeding the electrical threshold of power. In this example, the power threshold can include an electrical threshold of 240 volt-amps for a time period of one minute.

In some examples, the first timer 350 can be activated or started when the power supply 344 exceeds an electrical threshold of power provided to the computing components 348 through the power rail 346. In some examples, the first timer 350 can determine a quantity of time that the power supply 344 exceeds the electrical threshold of power provided to the computing components 348 through the power rail 346. In some examples, the first timer 350 can include a fixed time period. As described herein, the fixed time period can correspond to the time period of the power threshold such that the power supply 344 can be deactivated prior to exceeding the time period of the power threshold. In some examples, the load of the computing components 348 can be altered by the controller 300 to a level below the electrical threshold of power from the power threshold before the first timer 350 reaches the fixed time period.

As described herein, the first timer 350 can be utilized to determine a quantity of time that the power supply 344 has exceeded an electrical threshold of power from the power threshold. In some examples, the first timer 350 can determine a quantity of time the power supply 344 is continuously exceeding the electrical threshold of the power threshold. For example, the first timer 350 can start when the power supply 344 exceeds the electrical threshold of the power threshold. In this example, the first timer 350 can restart or stop if the power supply 344 falls below the electrical threshold of the power threshold. In this example, the first timer 350 can start again when the powers supply 344 exceeds the electrical threshold of the power threshold and the first timer 350 can restart from a beginning or start without including the time the power supply 344 previously exceeded the electrical threshold of the power threshold.

In this way, the first timer 350 can be utilized to determine continuous time that the power supply 344 is exceeding the electrical threshold and not utilized to determine a total time that the power supply 344 has historically exceeded the electrical threshold. In some examples, a second timer 352 can be utilized to determine when to restart the first timer 350. As used herein, restarting the first timer 350 can include resetting the first timer 350 to a start time or to a quantity of time that is equal to zero.

In some examples, the system 340 can include a second timer 352 to determine a quantity of time the power supply 344 has continuously been below the power threshold. In some examples, the second timer 352 can be utilized to determine a quantity of time the power supply 344 is continuously below the electrical threshold of the power threshold. In some examples, the second timer 352 can be utilized to determine when the first timer 350 is to be restarted. For example, the second timer 352 can start when the power supply 344 is altered from a power level that exceeds the power threshold to a power level that is below the power threshold. In this example, the first timer 350 can stop and the second timer 352 can start when the power supply 344 is altered to a power level below the power threshold. In this example, the first timer 350 can be restarted or zeroed when the second timer 352 reaches a fixed time period.

In some examples, the second timer 352 can ensure that the power supply 344 is at a power level below the upper level of the power threshold for a particular period of time before restarting or zeroing the first timer 350. In some examples, the second timer 352 can determine when the period of time that the power supply exceeds the electrical threshold of the power threshold is a continuous period of time. For example, the second timer 352 can have a fixed time period for restarting or zeroing the first timer 350. In this example, the first timer 350 can be restarted or zeroed when the second timer 352 reaches the fixed time period. In some examples, the fixed time period can be a relatively short period of time that can extend beyond a natural spike (e.g., rapid increase, etc.) or crash (e.g., rapid decrease, etc.) in power provided to the load. For example, the fixed time period can be 3 seconds to ensure that the drop in power is not a crash or rapid decrease that will return to a power level that exceeds the power threshold.

In some examples, the first timer 350 can continue to count and not restart at zero when the second timer 352 does not reach the fixed time period. For example, the first timer 350 can reach a quantity of time of 30 seconds when the power supply 344 has exceeded the electrical threshold of the power threshold. In this example, the second timer 352 can start when the power supply 344 falls below the electrical threshold of the power threshold. In other examples, the first timer 350 can continue to count during the time the second timer 352 is counting. In this example, the first timer 350 may not stop until the second timer 352 reaches the fixed time period. The first timer 350 can start at 30 seconds when the second timer 352 does not reach a fixed time period and the first timer 350 can restart or be zeroed at 0 seconds when the second timer reaches the fixed time period. In this way, the second timer 352 can ensure that the power supply 344 remains below the electrical threshold of the power threshold for a particular time period (e.g., minimum time period, etc.) before resetting the first timer 350. In this way, the second timer 352 can act to ignore momentary or falsely interpreted excursions below the power threshold. The second timer 352 can help ensure that the first timer 350 is reset as a result of intentional time periods below the power threshold.

As used herein, a memory resource 304 can be a non-transitory machine-readable storage medium. The memory resource 304 can include instructions 354 that can be executable by a processing resource to stop the first timer 350 when the second timer 352 has reached a first time limit. In some examples, the first timer 350 can be stopped and/or restarted when the second timer 352 has reached a first time limit. In some examples, the first timer 350 can continue when the second timer 352 is started, such that the first timer 350 continues counting while the second timer 352 is counting. For example, the controller 300 can determine that the power supply 344 has dropped below the electrical threshold of the power threshold and start the second timer 352. In this example, the first timer 350 can continue to determine a quantity of time as if the power supply 344 was providing power above the electrical threshold of the power threshold until the second timer 352 reaches the first time limit. As described herein, the first timer 350 can be stopped, restarted, and/or zeroed when the second timer 352 has reached the first time limit and the first timer 350 can continue when the second timer 352 has not reached the first time limit. In this way, the first timer 350 can ensure that the power supply 344 does not exceed the electrical threshold of the power threshold for longer than the time period defined by the power threshold.

The memory resource 304 can include instructions 356 that can be executable by a processing resource to stop the second timer 352 when the power supply 344 has exceed the power threshold. As described herein, the second timer 352 can be utilized to determine a quantity of time that the power supply 344 is continuously below the electrical threshold of the power threshold. In some examples, the second timer 352 can be stopped when it is determined that the power supply 344 has exceeded the electrical threshold of the power threshold and has not continuously been below the electrical threshold of the power threshold. When the power supply 344 has exceeded the electrical threshold of the power threshold before the second timer 352 reaches the first time limit, the first timer 350 can continue as if the power supply 344 never fell below the electrical threshold of the power threshold or can continue at the same quantity of time prior to dropping below the electrical threshold of the power threshold.

The memory resource 304 can include instructions 358 that can be executable by a processing resource to deactivate the power supply 344 when the first timer 350 reaches a second time limit. As described herein, the first timer 350 can include a fixed period of time that can be based on the power threshold. In some examples, the second time limit can correspond to the fixed period of time and when the first timer 350 reaches the second time limit the power supply 344 can be deactivated to prevent the power supply 344 for breaking legal restrictions as described herein.

In some examples, the memory resource 304 can include instructions that can executable by a processing resource to set the first timer to zero when the second timer has reached the first time limit and set the second timer to zero when the power supply has exceeded the power threshold. That is, the second timer can be utilized to determine when the first timer should be restarted or zeroed. In some examples, the first time limit can be a quantity of time that the power supply is below the electrical threshold power threshold that is acceptable to bring the power supply above the electrical threshold of the power threshold. That is, the first time limit can be a quantity of time where it can be determined that power delivered has been below the power threshold for what is deemed a sufficiently long enough period of time.

In some examples, the memory resource 304 can include instructions that can be executable by a processing resource to alter a load of the plurality of computing components to prevent the first timer from reaching the second time limit. As described herein, the performance of the computing components can be altered to lower or increase a load of the computing components. For example, the computing components can be altered to a boost mode that can increase the load of the computing components. In another example, the components can be altered from the boost mode to a normal mode to decrease the load of the computing components. In some examples, the boost mode can be a relatively higher performance level of the computing components compared to the normal mode. In some examples, the load of the computing components can be altered to stop the first timer or restart the first timer.

Figure 4:
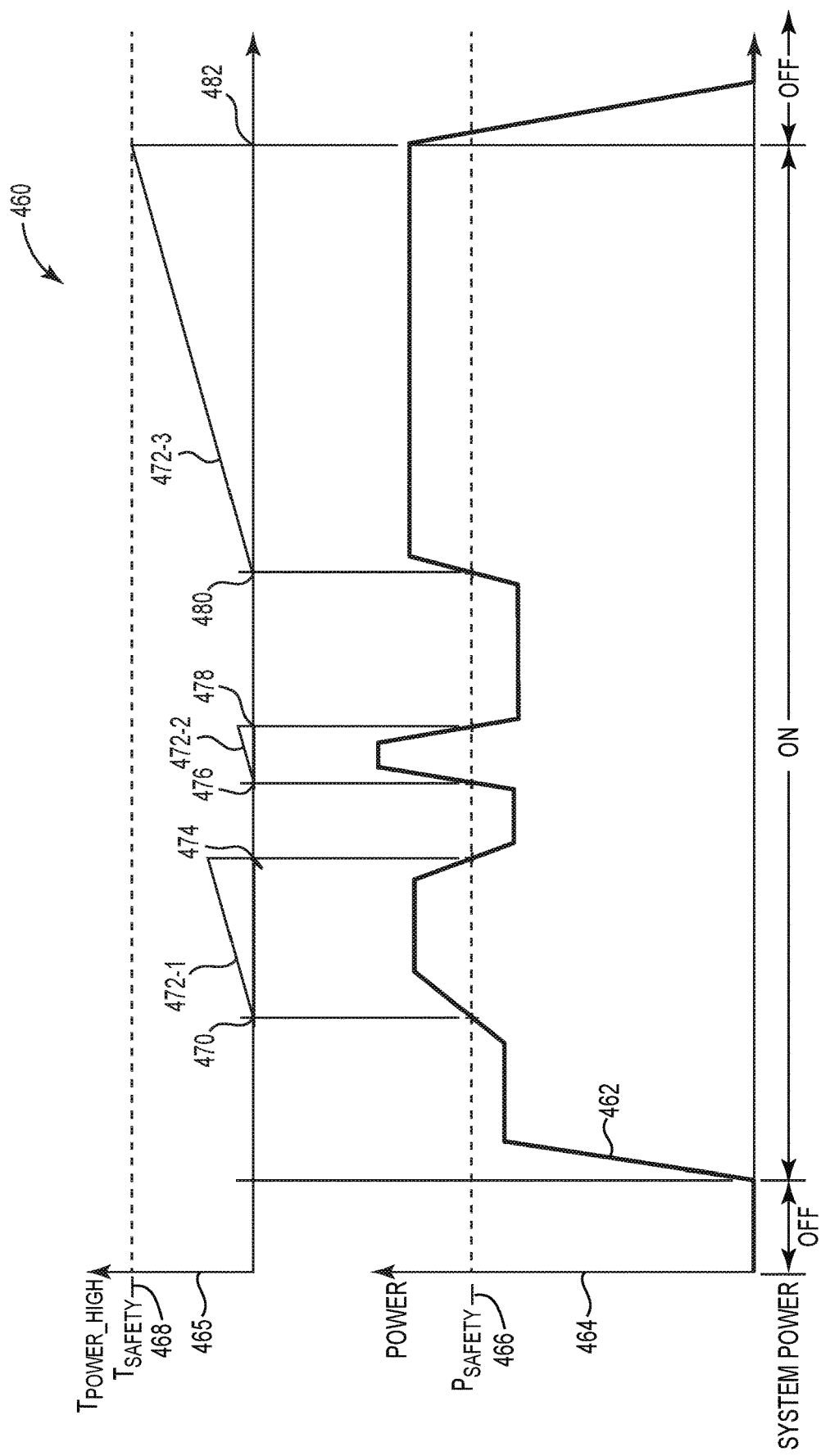
FIG. 4 illustrates an example chart for a power supply consistent with the present disclosure.

FIG. 4 illustrates an example chart 460 for a power supply consistent with the present disclosure. In some examples, the chart 460 can include a time-varying system power 462 that can represent a power level 464 for a power supply over a period of time. As described herein, the power supply can provide different power levels to computing components based on the load of the computing components. In some examples, the power supply can include a power threshold that can correspond to a legal restriction for the power supply that defines an electrical threshold of power threshold 466 and a time threshold 468. In one example, the electrical threshold of the power threshold 466 can be 240 volt-amps and the time threshold 468 can be for a period of one minute. That is, the power supply may not legally exceed 240 volt-amps continuously for a period longer than one minute.

In some examples, the chart 460 can represent a quantity of time 465 for a timer. In some examples, the chart 460 can represent time periods 472-1, 472-2, 472-3 that are determined utilizing a timer as described herein. In some examples, the time periods 472-1, 472-2, 472-3 can represent a quantity of time 465 that a power supply has exceeded an electrical threshold 466. In some examples, the power supply can exceed the electrical threshold 466 for a period of time that is less than the defined time threshold 468 of the power threshold 466. For example, the power supply can exceed the electrical threshold 466 at time 470, which can start the timer for the time period 472-1. In this example, the power supply can drop below the electrical threshold 466 at time 474. In this example, the timer can restart or start back at zero when the power supply exceeds the electrical threshold 466 at time 476, which can start the timer for the time period 472-2. In addition, the timer can restart or start back at zero when the power supply falls below the electrical threshold 466 at time 478.

As described herein, the timer can be utilized to prevent the power supply from exceeding the electrical threshold 466 for longer than a defined time period. For example, the power supply can exceed the electrical threshold 466 at time 480, which can start the time period 472-3. In this example, the timer can reach the time threshold 468 at time 482 and a controller can deactivate a corresponding power rail (e.g., offending power rail, etc.) or turn off the time-varying system power 462 of the power supply at time 482. In this way, the power supply is prevented from supplying power that exceeds the electrical threshold 466 for longer than the time threshold 468.

Figure 5:
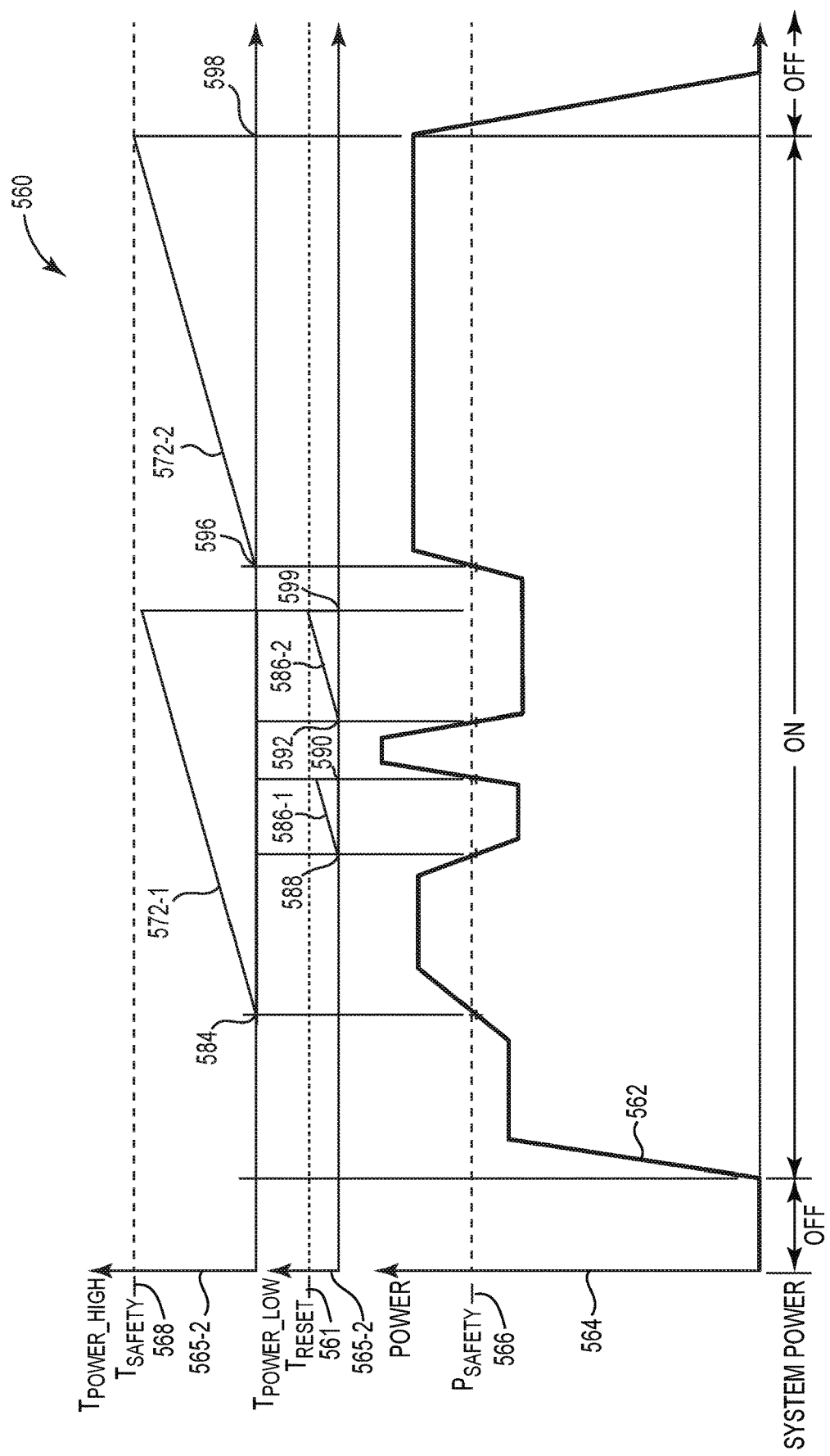
FIG. 5 illustrates an example chart for a power supply consistent with the present disclosure.

FIG. 5 illustrates an example chart 560 for a power supply consistent with the present disclosure. In some examples, the chart 560 can represent the time-varying system power 562 of a power supply similar to chart 460 as illustrated in FIG. 4. FIG. 5 illustrates a quantity of power 564 provided to computing components and a power threshold 566. FIG. 5 also illustrates a first quantity of time 565-1 with a first time threshold 568 and a second quantity of time 565-2 with a second time threshold 561. In some examples, the first time threshold 568 can be a threshold of a first timer that can initiate a deactivation of the power supply as described herein. In some examples, the second time threshold 561 can be a threshold of a second timer that can restart or zero the first timer as described herein. In some examples, an electrical threshold 566 that may not be exceeded for longer than a time threshold 568 is monitored by the first timer. In addition, the first timer may not be reset or zeroed until a second timer reaches a reset threshold 561.

In some examples, the quantity of power 564 provided by the power supply can exceed the upper level power threshold 566 and the first timer can start at 584, which can be the start of the time period 572-1. In this example, the quantity of power 564 can fall below the upper level power threshold 566 at time 588 and the second timer can start the time period 586-1. In this example, the quantity of power 564 can exceed the upper level power threshold 566 before the time period 586-1 reaches the time threshold 561. Thus, in this example, the first timer continues with the time period 572-1 as if the quantity of power 564 did not drop below the upper level power threshold 566.

In some examples, the quantity of power 564 can fall below the upper level power threshold 566 at time 592 and the second timer can start the time period 586-2. In these examples, the second timer can exceed the time threshold 561 at time 599 and the first timer can be stopped or zeroed at time 599. In this way, the quantity of power 564 provided by the power supply may fall below the electrical threshold 566 for a quantity of time that is greater than the time threshold 561 before restarting, stopping, or zeroing the first timer.

In another example, the quantity of power 564 provided by the power supply can exceed the upper level power threshold 566 at time 596, which can start the first timer for time period 572-2. In this example, the time period 572-2 can exceed the time threshold 568 at time 598 and the system power 562 can be deactivated. For example, the power supply that is supplying the quantity of power 564 can be deactivated at 598 when the first timer reaches the time threshold 568 as described herein.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system, comprising:
a power supply coupled to a plurality of computing components by a single power rail;
a first timer to determine a quantity of time the power supply has continuously exceeded a power threshold;
a second timer to determine a quantity of time the power supply has continuously been below the power threshold; and
a controller, comprising instructions to:
stop the first timer when the second timer has reached a first time limit;
stop the second timer when the power supply has exceeded the power threshold; and
deactivate the power supply when the first timer reaches a second time limit.

2. The system of claim 1, wherein the controller includes instructions to:
set the first timer to zero when the second timer has reached the first time limit; and
set the second timer to zero when the power supply has exceeded the power threshold.

3. The system of claim 1, wherein the controller includes instructions to alter a load of the plurality of computing components to prevent the first timer from reaching the second time limit.

4. A controller, comprising instructions to:
set a first timer to determine a quantity of time a power supply has continuously exceeded a power threshold;
set a second timer to determine a quantity of time the power supply has continuously been below the power threshold;
stop the first timer when the second timer has reached a first time limit;
stop the second timer when the power supply has exceeded the power threshold; and
deactivate the power supply when the first timer reaches a second time limit.

5. The controller of claim 4, wherein the power supply is coupled to the computing component through a single power rail.

6. The controller of claim 4, comprising instructions to alter a load of a computing component below the power threshold when the first timer reaches a second time limit.

7. The controller of claim 4, comprising instructions to:
set the first timer to zero when the second timer reaches a first time limit; and
set the second timer to zero when the power supply has exceeded the power threshold.

8. A non-transitory machine-readable storage medium having stored thereon machine-readable instructions to cause a computer processor to:
set a first timer to determine a quantity of time a power supply has continuously exceeded a power threshold;
set a second timer to determine a quantity of time the power supply has continuously been below the power threshold;
stop the first timer when the second timer has reached a first time limit;
stop the second timer when the power supply has exceeded the power threshold; and
deactivate the power supply when the first timer reaches a second time limit.

9. The medium of claim 8, comprising instructions to restart the first timer when the second timer has reached a first time limit.

10. The medium of claim 8, comprising instructions to restart the second timer when the power supply has exceeded the power threshold.

11. The medium of claim 8, comprising instructions to alter a load of the plurality of computing components before the first timer reaches the second time limit.

12. The medium of claim 8, wherein the power supply is coupled to the computing component through a single power rail.

* * * * *